United States Patent
Paruthi et al.

(10) Patent No.: US 10,891,181 B2
(45) Date of Patent: Jan. 12, 2021

(54) SMART SYSTEM DUMP

(71) Applicant: International Business Machines Corporation, Armonk, NY (US)

(72) Inventors: Meghna Paruthi, Austin, TX (US); Mike C. Duron, Pflugerville, TX (US); Adriana Kobylak, Round Rock, TX (US); Nagendra K. Gurram, Bangalore (IN); Jason Albert, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 16/171,082

(22) Filed: Oct. 25, 2018

(65) Prior Publication Data
US 2020/0133761 A1    Apr. 30, 2020

(51) Int. Cl.
*G06F 11/07* (2006.01)
*G06N 20/00* (2019.01)

(52) U.S. Cl.
CPC ...... *G06F 11/0778* (2013.01); *G06F 11/0751* (2013.01); *G06N 20/00* (2019.01)

(58) Field of Classification Search
CPC .................................................. G06F 11/0778
USPC ....................................................... 714/38.11
See application file for complete search history.

(56) References Cited

U.S. PATENT DOCUMENTS

| | | |
|---|---|---|
| 586,767 A | 7/1897 | Hatfield |
| 5,682,523 A | 10/1997 | Chen et al. |
| 8,296,104 B2 | 10/2012 | Ramacher et al. |
| 9,317,356 B2 | 4/2016 | Cardona et al. |
| 9,703,647 B2 | 7/2017 | Ditto et al. |
| 2007/0074016 A1* | 3/2007 | Alpers ............... G06F 9/30003 713/2 |
| 2009/0259890 A1* | 10/2009 | Lund ................... H04L 43/0817 714/35 |
| 2011/0307233 A1* | 12/2011 | Tseng .................... G06F 30/331 703/14 |
| 2012/0151278 A1* | 6/2012 | Tsantilis ............... G06F 11/366 714/48 |
| 2015/0113334 A1* | 4/2015 | Raj ..................... G06F 11/0787 714/45 |
| 2016/0299809 A1 | 10/2016 | McCoy |
| 2017/0139764 A1* | 5/2017 | Batchelor ................ G06F 3/06 |
| 2017/0344419 A1* | 11/2017 | Watkins .............. G06F 11/0781 |
| 2018/0052451 A1* | 2/2018 | Billi-Duran ...... G05B 19/41835 |
| 2018/0074882 A1 | 3/2018 | Gurram et al. |
| 2018/0267858 A1* | 9/2018 | Bacha ................. G06F 11/0766 |

FOREIGN PATENT DOCUMENTS

EP          0586767 A1    3/1994

* cited by examiner

*Primary Examiner* — Chae M Ko
(74) *Attorney, Agent, or Firm* — Patterson + Sheridan, LLP (57) ABSTRACT

Techniques are disclosed for performing dump collection on a computing system. One technique includes detecting an error event on the computing system. After detecting the error event, a subset of hardware registers associated with the error event are determined. One or more hardware units within the computing system to capture data from are determined from a set of rules that specify an association between the one or more hardware units and the subset of hardware registers associated with the error event. Data is captured from each of the one or more hardware units.

20 Claims, 10 Drawing Sheets

SMART SYSTEM DUMP

BACKGROUND

The present disclosure generally relates to techniques for diagnosing errors in a computing system, and more specifically, to improved techniques for performing dump collection for computing systems with limited resources.

Computer programs, such as operating systems, may experience hardware errors causing the program to terminate abnormally or otherwise fail from time to time (often referred to as a program or computer "crash"). In an effort to prevent similar crashes and thereby improve a program's stability, diagnostic and/or debugging operations are typically performed that capture a snapshot of the current state of the computer at the time of the crash. The snapshot, sometimes referred to as a "dump" may include a "core dump," "memory dump," or "system dump." The snapshot (dump) typically includes data from the computer's memory, as well as data from the processor (e.g., data stored in the processor registers or cache, information about the processor registers, flags, etc.) that had been executing the program at the time of the crash.

SUMMARY

One embodiment presented herein includes a method for performing dump collection on a computing system. The method generally includes detecting an error event within the computing system and, after detecting the error event, determining a subset of hardware registers of a plurality of hardware registers associated with the error event. The method also includes determining one or more hardware units within the computing system based on a set of rules that specify an association between the one or more hardware units and the subset of hardware registers associated with the error event. The method further includes capturing data from each of the one or more hardware units.

Other embodiments include, without limitation, a computer program product that includes a storage medium having computer-readable program code that enables a processing unit to implement one or more aspects of the disclosed methods as well as a system having a processor, memory, and application programs configured to implement one or more of the disclosed methods.

DETAILED DESCRIPTION

Embodiments provided in this disclosure include a method, computer program product, and system for performing an efficient dump collection for computing systems with limited resources, e.g., when critical system faults are detected on the computing system.

Conventional dump operations typically create dumps based on a number of fixed scenarios in which the same data is collected, regardless of the particular fail (or system fault) the computing system encountered. These fixed scenarios, for example, may include one or more generic types, such as "hardware failure," "operating system (OS) failure," etc. Each generic type may determine the set of fixed dump files (sometimes referred to as a Hardware Dump Content Table (HDCT)) to use when collecting data. The HDCT, for example, typically includes a list of commands (for the computing system) to execute in order to collect the data associated with the generic type. As shown in one reference example of a conventional HDCT below, the HDCT may specify a command with the format <command> <destination> <address> <value> for each generic type.

Example 1: HDCT with Generic Types

| TYPE | <command> <destination> <address> <value> |
|---|---|
| TYPE1\|TYPE2\|TYPE3 | getcfam pu 1000 -kall -nall -pall ec 10+ |
| TYPE1 | putscom pu 00010008 00000000000 -kall -nall -pall ec 10+ |
| TYPE2\|TYPE4 | getring pu func -kall -nall -pall ec 10+ |

In the above Example 1, the command "getcfam" generally reads data stored in the registers of the service interface logic, the command "putscom" generally writes data to registers available while logic clocks are on, and the command "getring" generally reads data available while logic clocks are off. Performing dump collection based on a HDCT with generic types, however, can lead to excess data collection. For example, the generic "hardware failure" HDCT type (e.g., TYPE1) may include the debug data for all possible types of hardware failures, many of which may not be relevant to the particular hardware failure the system encountered. This excess data collection can reduce the performance of the computing system performing the dump operation, e.g., by increasing the amount of time it takes a computing system to perform debug operations, consuming resources of the computing system, etc.

As such, embodiments presented herein configure a dump component to target and capture specific data that is used for diagnosing and debugging operations, e.g., as opposed to using a limited number of generic HDCT types to perform a dump. In one embodiment, the dump component uses a set of rules (e.g., fault translation rules) to determine the particular hardware units (HUs) (e.g., cores, memory controller, buses, pervasive units, etc.) to collect data from upon detecting an error event (or system fault). The set of rules map the fault isolation registers (FIRs) (e.g., check registers) active in the computing system to the hardware units in the computing system. After detecting an error event, the dump component identifies the triggered FIR(s), uses the rules to determine the associated hardware units, and collects the dump data from the associated hardware units.

By targeting and capturing data from the particular hardware units associated with a dump event, embodiments can significantly reduce the amount of data collected during a dump operation and reduce the amount of time that it takes to perform a dump operation, relative to conventional techniques.

Figure 1A:
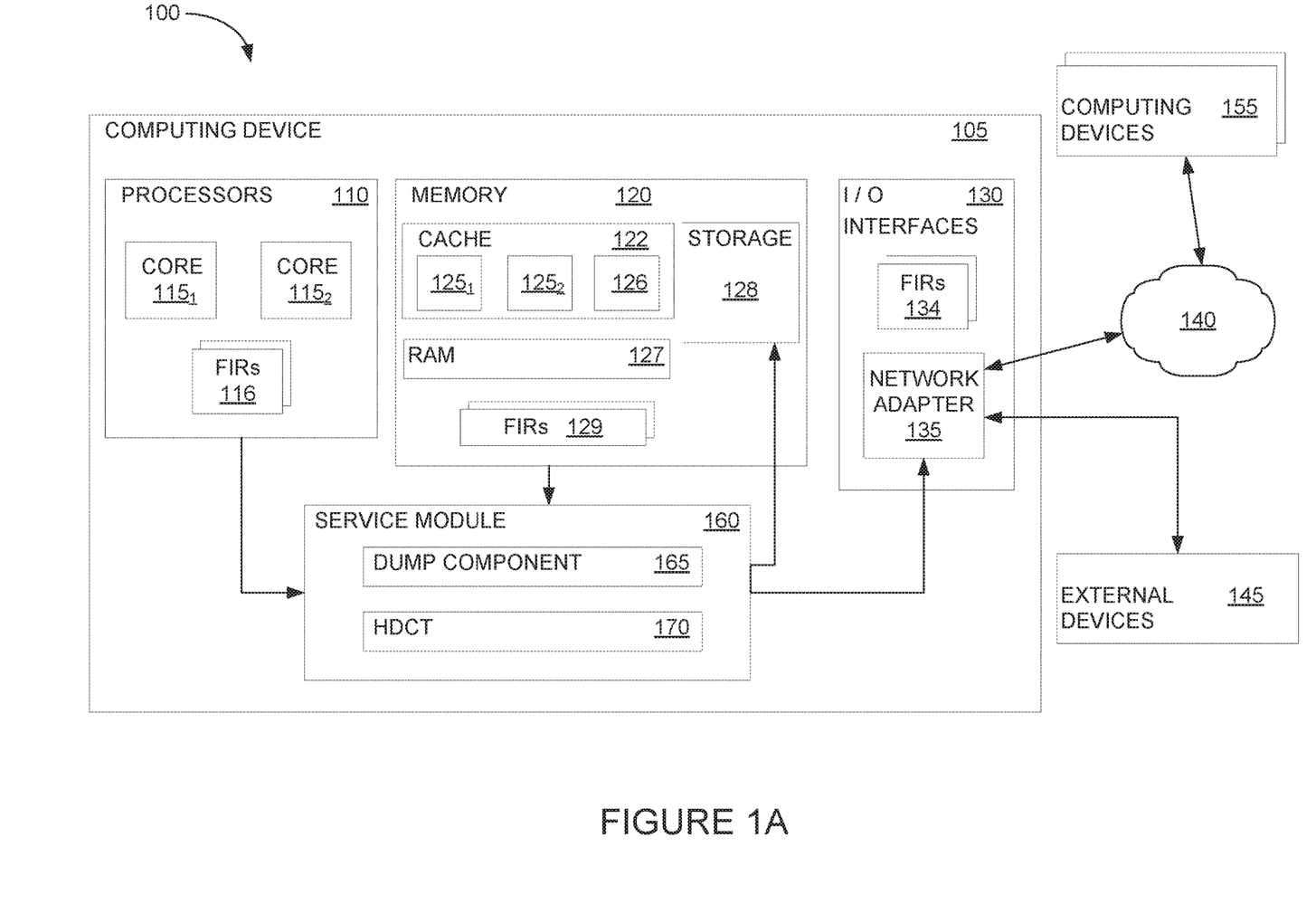
FIG. 1A illustrates an example of networked computing devices having components configured to perform dump collection, according to one embodiment.

FIG. 1A illustrates networked computing devices, according to one embodiment. At least one of the networked computing devices may be configured with a dump component 165 to perform an efficient dump collection using the techniques described herein.

Computing environment 100 includes a computing device 105 coupled to one or more other computing devices 155 through a network 140. Computing devices 105, 155 may generally include any general purpose or special purpose computing system capable of performing dump collection. Some examples of well-known computing systems that may be suitable for use as computing devices 105, 155 include, but are not limited to, personal computer systems, server computer systems, think or thick clients, hand-held, mobile, or laptop devices, multiprocessor systems, microprocessor-based systems, set top boxes, programmable consumer electronics, network PCs, minicomputer systems, mainframe computer systems, and so forth. As shown, computing device 105 includes several components, such as one or more processors 110, memory 120, and input/output (I/O) interfaces 130. Each of these components may be interconnected and may communicate using one or more system buses (not shown). Though not shown in detail, computing devices 155 may generally include similar components that are capable of performing similar computing and communications functions. In one embodiment, computing devices 155 may be the same as computing device 105.

Processors 110 may include one or more processing elements capable of performing the functions described herein. As shown, processors 110 include a plurality of processor cores $115_1$, $115_2$. While two cores $115_1$, $115_2$ are shown, in other embodiments the plurality of processor cores may include more than two cores (e.g., three, four, six, eight cores). The plurality of cores 115 may be included as a single processor (i.e., a multi-core processor) or distributed among multiple processors (i.e., one or more cores from each processor).

The memory 120 may include a variety of computer readable media selected for performance or other capabilities: volatile and/or non-volatile media, removable and/or non-removable media, etc. The memory 120 may include a cache 122, a random access memory (RAM) 127, and a storage 128. The cache 122 may be sub-divided into one or more elements, such as a cache $125_1$, $125_2$ corresponding to each processor core $115_1$, $115_2$ (for example, a level 1 cache included with each processor core), and may also include a cache 126 shared between the processor cores. RAM 127 may include one or more discrete memory modules, such as dynamic RAM (DRAM) dual inline memory modules (DIMMs). Of course, various memory chips, bandwidths, and form factors may alternately be selected. Storage 128 may typically provide a non-volatile memory for the computing device 105, and may include one or more different storage elements such as Flash memory, a hard disk drive, a solid state drive, an optical storage device, and/or a magnetic storage device.

The computing device 105 may communicate with other devices using one or more I/O interfaces 130. One or more external devices 145 may communicate through I/O interfaces 130, such as a display, keyboard, pointing device, etc. The computing device 105 may also communicate with networking devices through I/O interfaces 130, such as a network adapter 135 or modem, in order to establish communication with other computing devices 155 through network 140. Network 140 may include one or more networks of various types, including a local area or local access network (LAN), a general wide area network (WAN), and/or a public network (e.g., the Internet). Of course, other hardware and/or software components may be used in conjunction with computing devices 105. Examples include, but are not limited to microcode, device drivers, redundant processing units, external disk drive arrays, RAID systems, tape drives, and data archival storage systems, etc. In some embodiments, one or more of the computing devices 155 may be located in a cloud environment (e.g., as part of a cloud computing service).

Figure 1B:
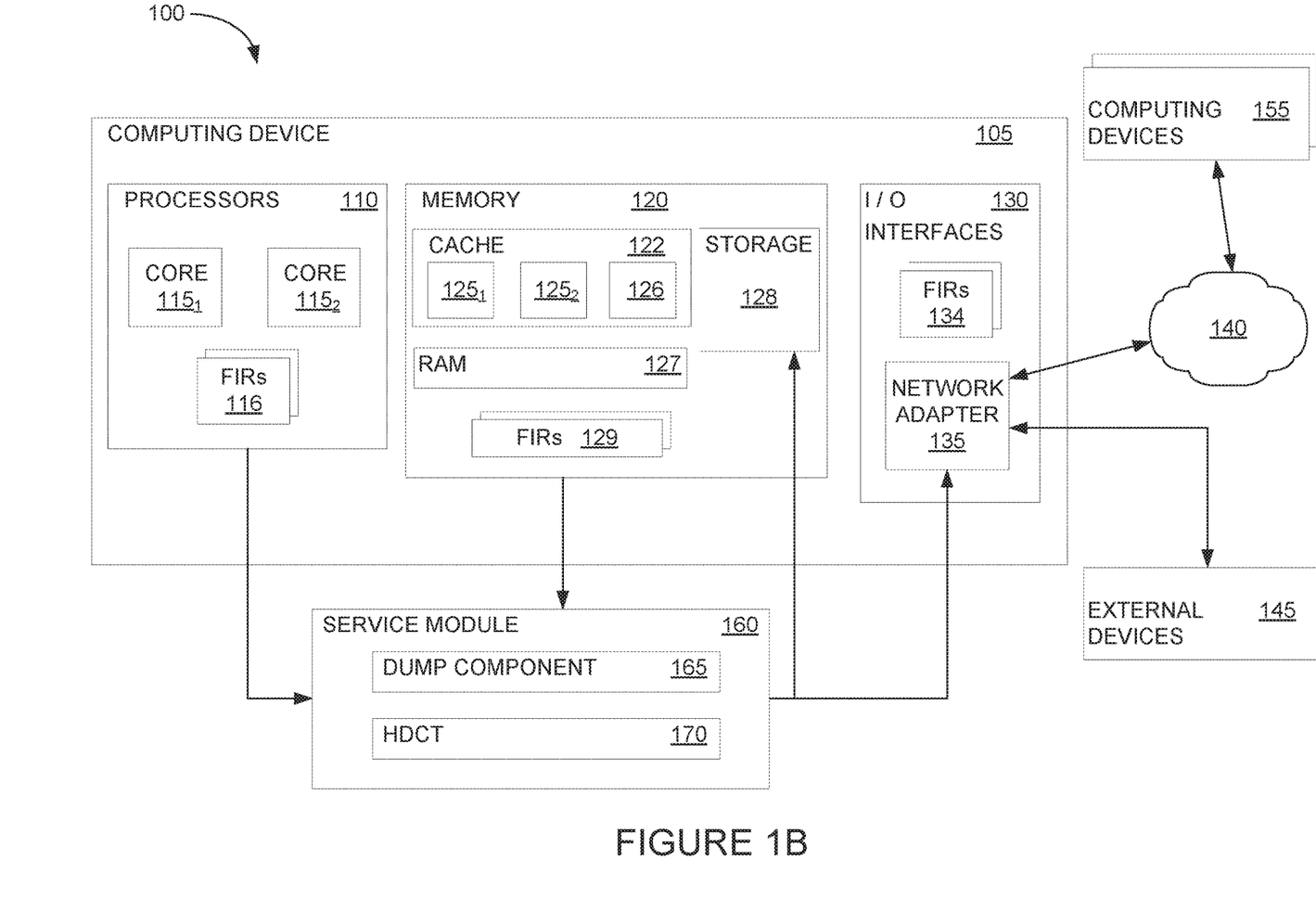
FIG. 1B illustrates another example of networked computing devices having components configured to perform dump collection, according to one embodiment.

Computing device 105 includes a service module 160 that is generally configured to perform data capture during a dump event. Beyond data capture, service module 160 may perform additional service or administrative functions (e.g., sensor monitoring) during the operation of computing device 105. Though depicted separately from other components of computing device 105, service module 160 may be a distinct component in some embodiments or may be implemented using components of the computing device 105 in other embodiments. For example, the service module 160 may be a separate hardware or firmware module included in the computing device 105 (e.g., a service processor, baseboard management controller (BMC), etc.), or may be implemented using an application included in storage 128 and configured to execute on one of the processor cores 115 and to read and write to a portion of storage 128. In an alternate embodiment shown in FIG. 1B, service module 160 may be implemented outside of computing device 105 (for example, using another computing device communicatively coupled to computing device 105). In another alternate embodiment shown in FIG. 1C, service module 160 may be configured to communicate with computing device(s) 155 in a cloud computing service 190.

As defined herein, a dump (or error) event may include any type of operation in which raw data is captured and/or stored for analysis. A dump event may include a "core dump," "memory dump," or "system dump," which generally capture a snapshot of memory regions associated with a particular software process when the process terminates abnormally (or "crashes"). For example, a failure of an application or of an operating system may trigger a core dump. However, dump events need not be limited to extraordinary events such as crashes or failures, but may include data captures that occur during regular operations. For example, a dump event may include taking a snapshot of the contents of a processor register, a particular RAM chip or module, a sector or other portion of a hard drive, etc. as part of hardware reliability testing. Of course, other contexts for capturing system data are possible.

Computing device 105 may include hardware detection circuitry that is used to detect erroneous hardware operations. Error-checking hardware may include parity error detection that is coupled to a processor instruction bus, error correcting code (ECC) on caches and system buses, etc. The computing device 105 may employ error-checkers within different hardware units (e.g., processor 110, memory 120, I/O interfaces 130, etc.) to encounter any errors that occur. For example, once an error occurs, the error-checkers may capture error-checker signals associated with the error, and store the error-checker signals in hardware FIRs. Each FIR may include/store a unique footprint associated with the captured error.

In embodiments herein, service module 160 may use FIRs 116, 129, and 134 within the computing device 105 to store error-checker signals upon detecting an error event. That is, FIRs 116, 129, and 134 may store error-checker signals associated with different hardware units in computing device 105. For example, FIRs 116 may store error-checker flags/signals that are triggered upon faults associated with sub-units of processors 110, FIRs 129 may store error-checker flags/signals that are triggered upon faults associated with sub-units of memory 120, and FIRs 134 may store error-check flags/signals that are triggered upon faults associated with sub-units of I/O interfaces 130. Service module 160 may be configured to interpret the error data that is captured by the FIRs to determine the root cause of the error event.

Figure 1C:
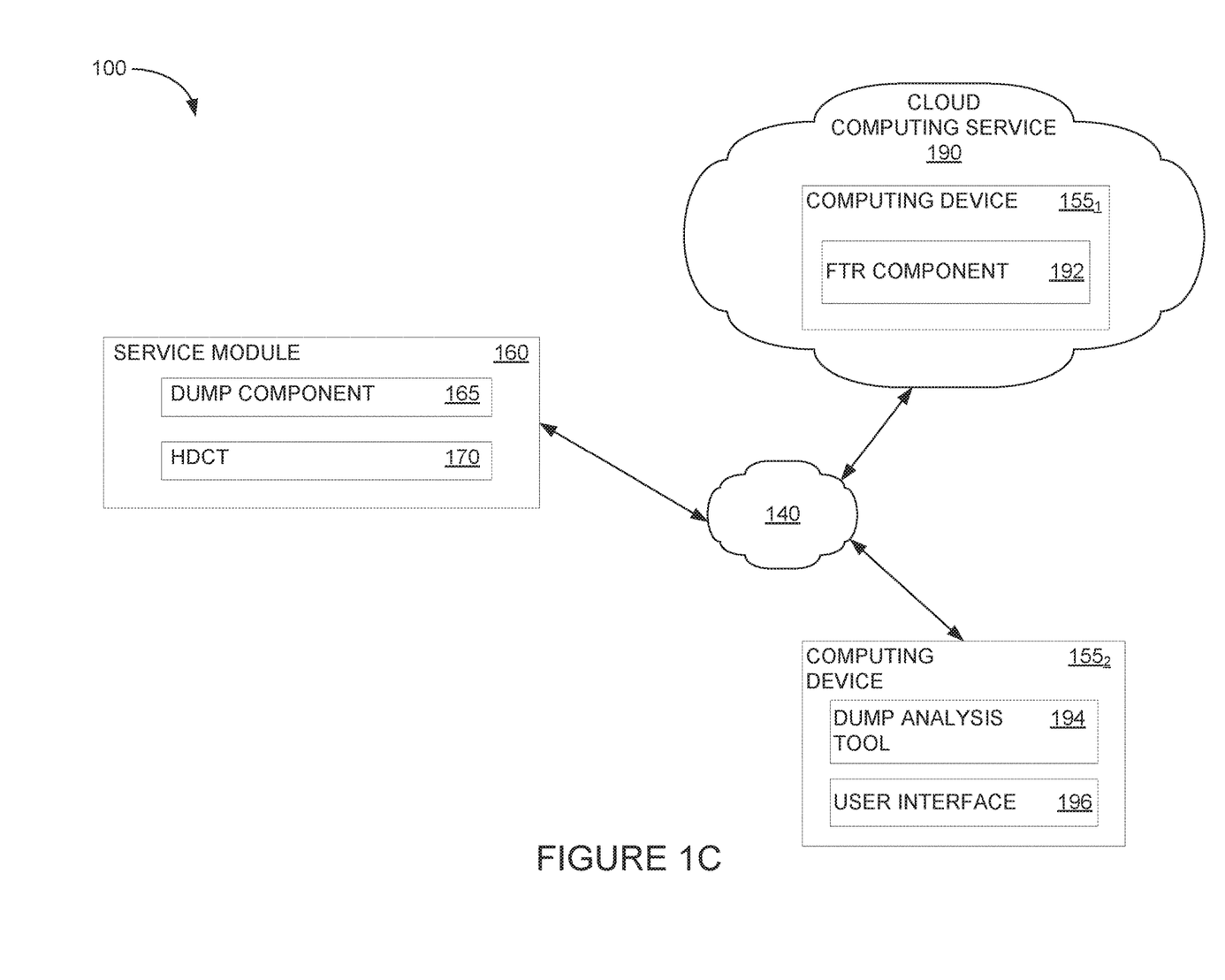
FIG. 1C illustrates another example of networked computing devices having components configured to perform dump collection, according to one embodiment.

In many cases, the data capture associated with a dump event is performed for diagnostic or debugging purposes, and may include relatively large amounts of data. For example, when a system failure or dump event trigger occurs, the service module 160 may analyze the FIR(s) 116 data to determine the type of dump to perform, and start the dump process. As part of the dump process, the service module 160 reads the HDCT (e.g., the HDCT shown in Example 1) and collects the hardware data in the order the HDCT specifies. For example, the HDCT may specify to capture certain contents of memory 120, which may include content at specific memory addresses associated with the failed process. The captured data may include some or all of certain portions of memory 120. For example, if the failed process had been executing on processor core $115_2$ and using data from storage 128, the service module 160 may capture (according to the HDCT) the data in cache $125_2$ (which corresponds to the core $115_2$), some or all of the data in shared cache 126, some or all of RAM 127, and/or some of storage 128. The captured data may also include portions of memory 120 not specifically associated with the failed process. Along with the data specified in the HDCT, the service module 160 may collect auxiliary information about the hardware collection (e.g., errors, list of cores in a particular mode (e.g., type of sleep mode), etc.) and/or system information (e.g., firmware information, dump policies, cause of dump information, etc.). The service module 160 may store the information to a dump file, which can be stored in a separate memory of the service module 160 and/or stored to storage 128 of the computing device 105. In some embodiments, the service module 160 may transmit the dump file to another computing device 155 (e.g., hardware management console (HMC)) and/or to the cloud computing service 190 (e.g., via network 140).

Figure 2:
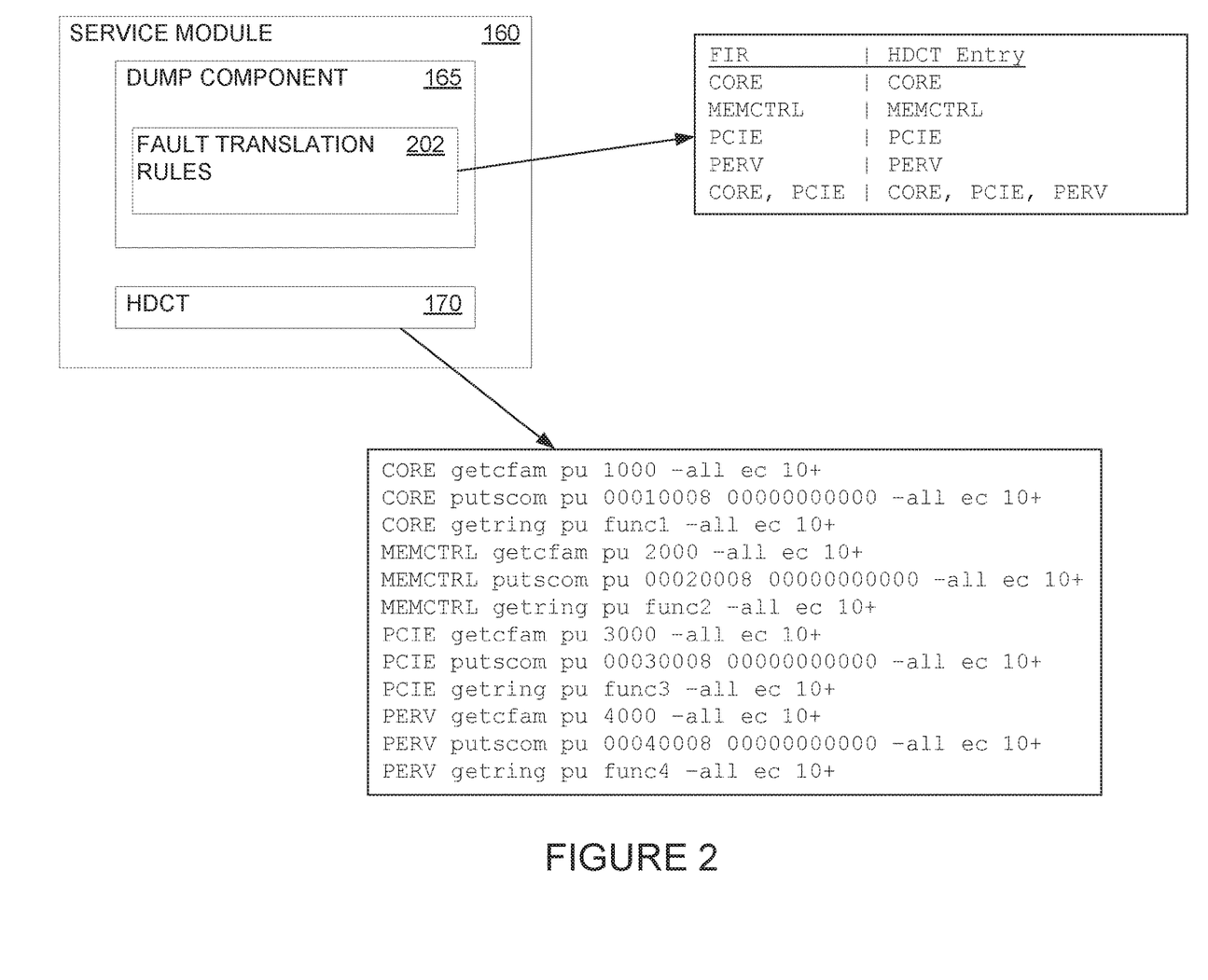
FIG. 2 illustrates a block diagram of components of a service module configured to perform dump collection, according to one embodiment.

In embodiments herein, service module 160 may use dump component 165 and HDCT 170 to perform an optimized dump collection. For example, dump component 165 may be configured to reduce the amount of data collected during a dump, and in turn, the amount of time that it takes to perform the dump by using a set of rules to determine the particular hardware units of computing device 105 to collect data from after detecting an error event. In one embodiment of service module 160 shown in FIG. 2, the dump component 165 may include a set of fault translation rules (FTRs) 202 that map the FIRs within computing device 105 to the hardware units within computing device 105. In the reference example shown in FIG. 2, the FTRs 202 specify that: (1) if the "CORE" FIR is on, only the "CORE" HDCT entries are dumped; (2) if the "MEMCTRL" (memory controller) FIR is on, only the "MEMCTRL" HDCT entries are dumped; (3) if the "PCIE" (PCI Express) FIR is on, only the "PCIE" HDCT entries are dumped; (4) if the "PERV" (pervasive unit) FIR is on, only the "PERV" HDCT entries are dumped; and (5) if both the "CORE" and "PCIE" entries are on, the "CORE," "PCIE" and "PERV" HDCT entries are dumped. Additionally, as shown in FIG. 2, the dump component 165 is configured to use HDCT 170, which is centered around the hardware units in computing device 105, as opposed to generic types (such as the HDCT in Example 1).

The use of FTRs 202 may allow the service module 160 to perform a more efficient dump collection, compared to conventional dump systems. For example, if an administrator determines an additional hardware unit should be captured for a particular FIR signature, an additional entry can be added to the FTRs 202 with no change to the underlying HDCT. This allows for smaller, incremental growth in the system dump, compared to conventional dump systems in which any addition to the dump substantially increases the size of the dump for a large number of error events that do not use the additional data.

Figure 3:
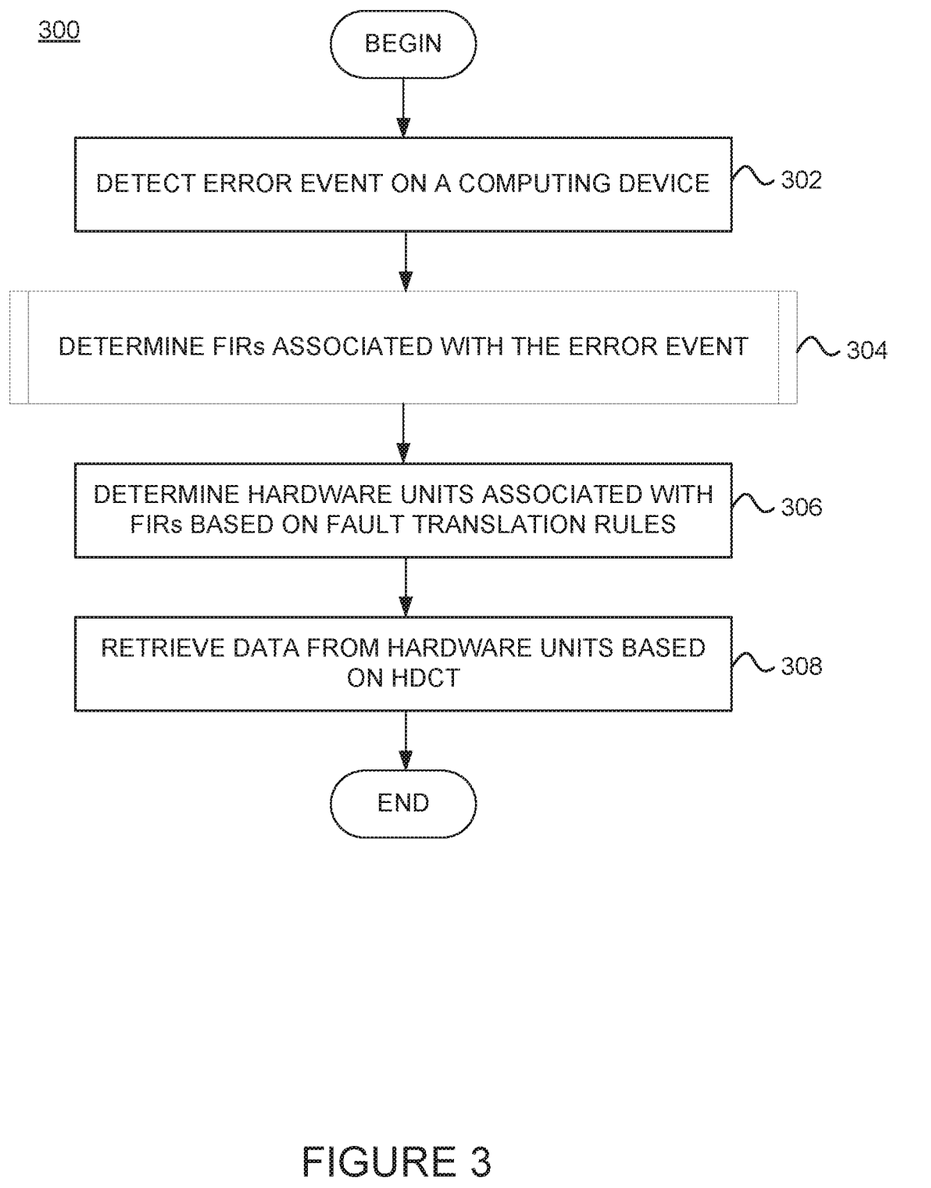
FIG. 3 is a flow chart illustrating a method for performing dump collection, according to one embodiment.

FIG. 3 illustrates a method 300 for performing a dump collection, according to one embodiment. The method 300 may be performed by the service module 160 in FIGS. 1A, 1B and 1C. More generally, method 300 may be used with the individual and networked computing devices described in various embodiments above.

Method 300 begins at block 302, where the service module 160 detects an error event (or system fault) on a computing device (e.g., computing device 105). In one embodiment, the service module 160 may monitor a set of error checkers within the computing device to determine if an error event has occurred. For example, if an error occurs within processors 110 (e.g., on core $115_1$), error-checkers within processor 110 may capture and store error-checker signals from core $115_1$ into FIR(s) 116 associated with the core $115_1$ hardware unit.

At block 304, the service module 160 determines the FIRs associated with the error event. For example, as will be described in more detail with respect to FIG. 4, the service module 160 may perform real time analysis of the FIRs in the computing system to determine the type of dump to perform. At block 306, the service module 160 determines hardware units (associated with the FIRs) (e.g., determined at block 304) to collect data from based on a set of fault translation rules (e.g., fault translation rules 202). The fault translation rules generally represent a translation layer between the FIRs in the computing system and the HDCT. For example, the fault translation rules may include the FIR to hardware unit association (or mapping), which allows the service module to target (and collect data from) the particular hardware unit(s) associated with the error event.

In one embodiment, the fault translation rules may be manually (pre)-configured for the service module 160. In this embodiment, the fault translation rules may be a local set of fault translation rules maintained within service module 160, e.g., as shown in FIG. 2. In another embodiment, described in more detail below, the fault translation rules used by the service module 160 may be an updated set of fault translation rules generated via a machine learning module. In this embodiment, the fault translation rules used by the service module 160 may be maintained and retrieved from a cloud computing service (e.g., cloud computing service 190), e.g., as shown in FIG. 1C.

At block 308, the service module 160 retrieves data from the hardware units (e.g., determined at block 306) based on the HDCT (e.g., HDCT 170). The HDCT entries within the HDCT may be based on the hardware units, as opposed to generic error types (typically used in conventional HDCTs). After block 308, the method ends.

Figure 4:
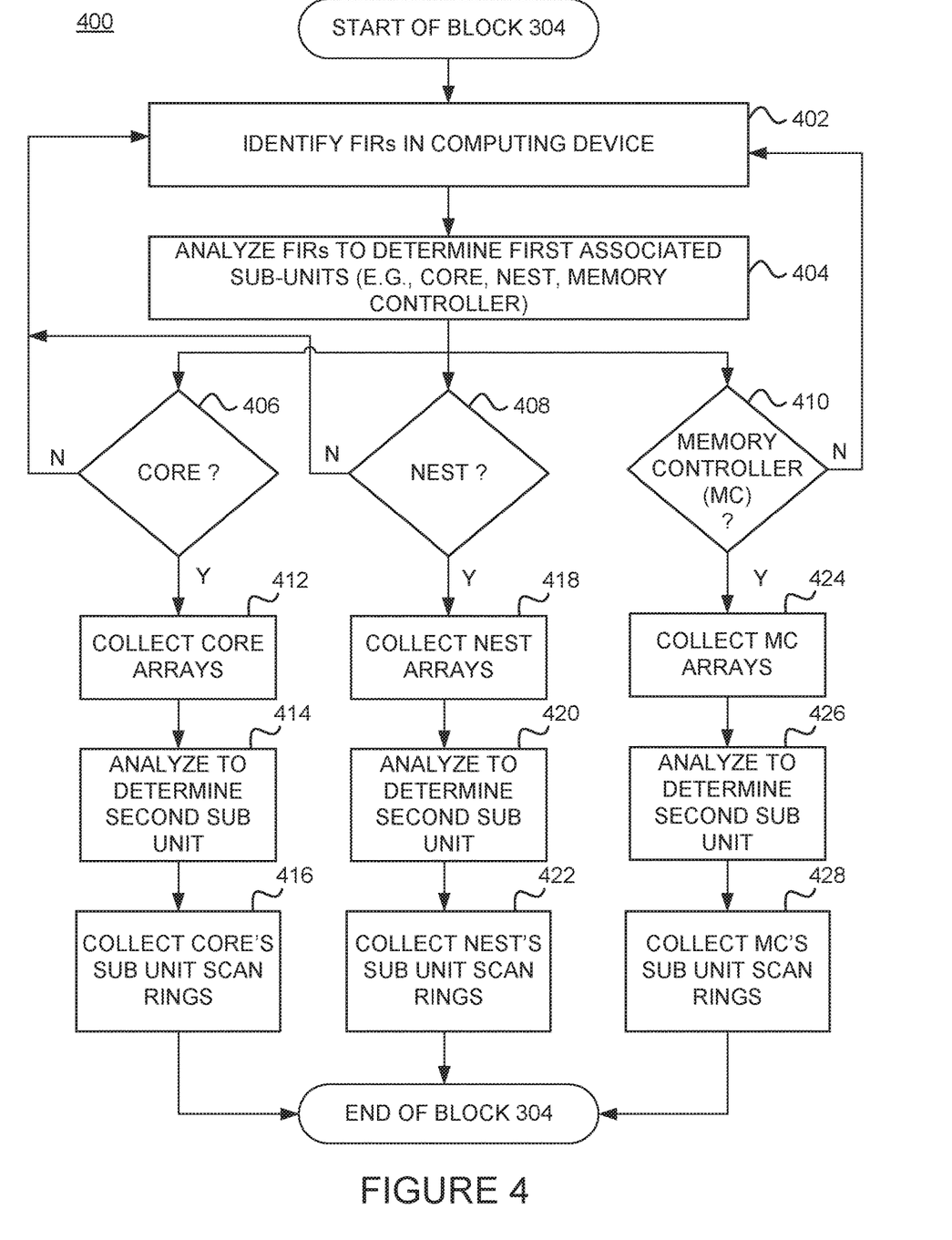
FIG. 4 is a flow chart illustrating a method for performing a real-time analysis of fault isolation registers in a computing device, according to one embodiment.

FIG. 4 illustrates a method 400 for performing real-time analysis of FIRs in a computing device (e.g., computing device 105) to determine what hardware units to collect dump data from. The method 400 may be performed by the service module 160 in FIGS. 1A, 1B and 1C. More generally, method 400 may be used with the individual and networked computing devices described in various embodiments above.

Method 400 begins at block 402, where the service module 160 identifies FIRs in the computing device 105. For example, the FIRs in the computing device 105 may be identified based on pre-defined configuration that includes a high level summary of the FIRs in the computing device 105. At block 404, the service module 160 analyzes the FIRs to determine the (first level of) sub-unit(s) of the computing device associated with the system fault. In one embodiment, for example, the (first level of) sub-units may include the cache, interconnect, memory, input/output subsystems of the computing system (e.g., collectively referred to as the "nest" of the computing system), the core(s), the memory controller (MC), etc.

If, at block 406, the service module 160 determines the core FIRs are triggered, the service module 160 collects the core arrays (block 412), analyzes the core arrays to determine the particular sub-units of the core (block 414), and collects the core's sub-unit scan rings (block 416). If, at block 408, the service module 160 determines the nest FIRs are triggered, the service module 160 collects the nest arrays (block 418), analyzes the nest arrays to determine the particular sub-units (block 420), and collects the nest's sub-unit scan rings (block 422). If, at block 410, the service module determines the MC FIRs are triggered, the service module 160 collects the MC arrays, analyzes the MC arrays to determine the particular sub-units (block 426), and collects the MC's sub-unit scan rings (block 428). The service module 160 can determines the FIRs associated with the error event based analyzing each sub-unit's scan rings.

As noted, in some embodiments, the service module 160 may interact with a cloud computing service (e.g., to request/receive fault translation rules). That is, instead of relying upon a local set of fault translation rules (e.g., fault translation rules 202), the service module 160 may use a set of fault translation rules received from a cloud computing service to perform the dump. For example, an administrator(s) may generate and update fault translation rules for the service module 160, and upload the fault translation rules to the cloud computing service. The fault translation rules may be generated based on data collected from previous dumps. The service module 160 may request (and receive) the fault translation rules from the cloud computing service in order to perform the dump. Additionally, or alternatively, the service module 160 may request (and receive) a HDCT that is stored within the cloud computing service.

As shown in FIG. 1C, for example, computing device 155$_1$ within the cloud computing service 190 may use a FTR component 192 to send FTR(s) to the service module 160. In one embodiment, an administrator may receive dump data from the service module 160, use the dump data to generate (and/or update) FTRs for the service module 160 to use, and upload the generated FTRs to the FTR component 192. The service module 160, after determining the FIRs associated with an error event (e.g., at block 304 of FIG. 3), may request the latest FTRs for the determined FIRs (e.g., FTRs for FIR "X") from the FTR component 192, and the FTR component 192 may send the FTRs to the service module 160 in response to the request.

Embodiments herein also provide techniques for offloading data collected in a dump (referred to herein as a dump offload). In conventional dump offloads, a HMC (e.g., one of computing device 155$s$ in FIG. 1) generally performs a dump offload by streaming the dump file headers, and then streaming the dump intermediate files in different portions of data, e.g., until all the hardware data has been offloaded. Performing a dump offload in this manner, however, is inefficient as the size of the dump is generally limited by the amount of available space on the computing device 105.

Accordingly, embodiments herein may configure the service module 160 to perform incremental transfer of dump portions, e.g., via the cloud computing service 190. Instead of storing the dump data in the computing device 105, the service module 160 continually offloads data to the cloud computing service 190 while the dump collection is being performed. At the end of the collection, the data can be extracted and analyzed from the cloud computing service 190. In this manner, service module 160 can store multiple dumps in the cloud computing service 190, as opposed to the size of the dump being limited to the available space on the computing device 105 or service module 160. In addition, by storing the dump in the cloud computing service 190, the data for the dump can persist until the data is no longer needed.

Figure 5:
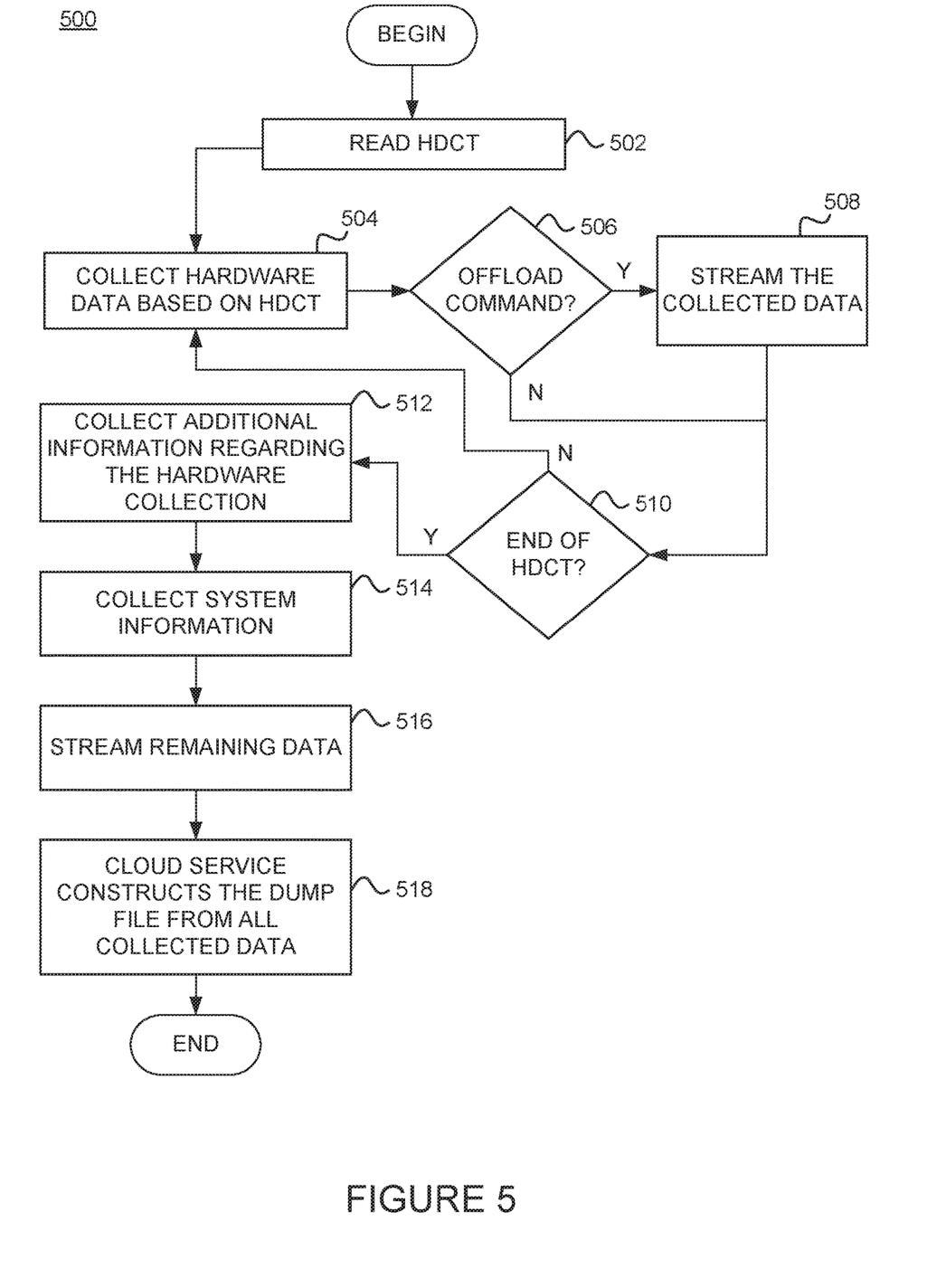
FIG. 5 is a flow chart illustrating a method for performing an incremental dump offload during a dump collection, according to one embodiment.

FIG. 5 illustrates a method 500 for performing an incremental dump offload during a dump collection. The method 500 may be performed by the service module 160 in FIGS. 1A, 1B and 1C. More generally, method 500 may be used with the individual and networked computing devices described in various embodiments above.

Method 500 begins at block 502, where the service module 160 reads the HDCT (e.g., HDCT 170) to determine which hardware units of the computing device (e.g., computing device 105) to collect data from. At block 504, the service module 160 collects hardware data based on the HDCT (e.g., in the order the HDCT specifies). At block 506, the service module 160 determines whether an offload command has been detected. For example, in some embodiments, the HDCT may contain an offload command at predetermined intervals, such as after every 100 scan communications interface (scoms) commands, every other trace array and ring, etc. If the service module 160 (at block 506) detects an offload command (e.g., in the HDCT), the service module 160 streams the collected data and uploads to the cloud computing service 190 (block 508). The service module 160 may perform operations in blocks 504, 506 and 508 until the service module 160 has reached the end of the HDCT.

Once the end of the HDCT is reached (block 510), the service module 160 collects additional information regarding the hardware collection (block 512). For example, such additional information can include the type of errors, list of cores in particular mode (e.g., sleep mode), etc. At block 514, the service module 160 collects system information (e.g., firmware information, dump policies, cause of dump information, etc.). At block 516, the service module 160 streams the remaining data (e.g., data collected from blocks 514 and 516) and uploads to the cloud computing service 190. At block 518, the dump file is constructed (e.g., at the cloud computing service 190) from all the collected data, and stored within the cloud.

As noted, in some embodiments, the service module 160 can be configured to use a set of FTRs and/or HDCT generated via a machine learning techniques, e.g., as opposed to FTRs manually created by an administrator. For example, a machine-learning model may be trained (e.g., with data collected from previous dumps, analysis data from debugging the previous dumps, etc.) to generate a set of FTRs and/or a HDCT based on data from a current dump. There are many different types of inductive and transductive machine-learning models that can be used for generating FTRs and/or a HDCT. Examples of machine-learning models include adsorption models, neural networks, support vector machines, radial basis functions, Bayesian belief networks, association-rule models, decision trees, instance-based models (e.g., k-NN), regression models, Hopfield networks, deep belief networks, and Qlearning models.

Many configurations and parameter combinations may be possible for a given type of machine-learning model. With a neural network, for example, the number of hidden layers, the number of hidden nodes in each layer, and the existence of recurrence relationships between layers can vary. True gradient descent or stochastic gradient descent may be used in the process of tuning weights. The learning rate parameter, which partially determines how much each weight may be adjusted at each step, may be varied. Input features may be normalized. Other parameters that are known in the art, such as momentum, may also be applied to improve neural network performance. In another example, decision trees can be constructed using a variety of approaches. Some non-limiting examples include the iterative dichotomiser 3 (ID3), Classification and Regression Tree (CART), and CHi-squared Automatic Interaction Detection (CHAD)) methods. These methods may use one or more different metrics to determine the order in which attribute values are examined in decision trees. Some non-limiting examples of such metrics include information gain and Gini impurity. In addition, pruning methods may be applied to improve decision tree performance. Some non-limiting examples of pruning techniques include reduced error pruning, cost complexity pruning, and alpha-beta pruning.

Furthermore, individual machine learning models can be combined to form an ensemble machine-learning model. An ensemble machine-learning model may be homogenous (i.e., using multiple member models of the same type) or nonhomogenous (i.e., using multiple member models of different types). Individual machine-learning models within an ensemble may all be trained using the same training data or may be trained using overlapping or non-overlapping subsets randomly selected from a larger set of training data.

FIG. 1C shows one embodiment of computing environment 100 in which computing device $155_2$ includes a dump analysis tool 194 and user interface 196. The dump analysis tool 194 may employ a machine learning model to generate and refine the FTRs and/or HDCT for dump collection. In the case of FTRs, the dump analysis tool 194 can analyze the dump collection, and remove unnecessary data for a given case and/or indicate areas where data from the dump collection is not sufficient (e.g., for debugging). In the case of the HDCT, the dump analysis tool 194 can identify data that is collected for each hardware unit, but not accessed in a dump for debugging, and refine the HDCT to remove the unnecessary data collection. Note that while FIG. 1C depicts the dump component 165 as separate from the dump analysis tool 194, in some embodiments, the dump component 165 and dump analysis tool 194 may be within a single computing device.

Figure 6:
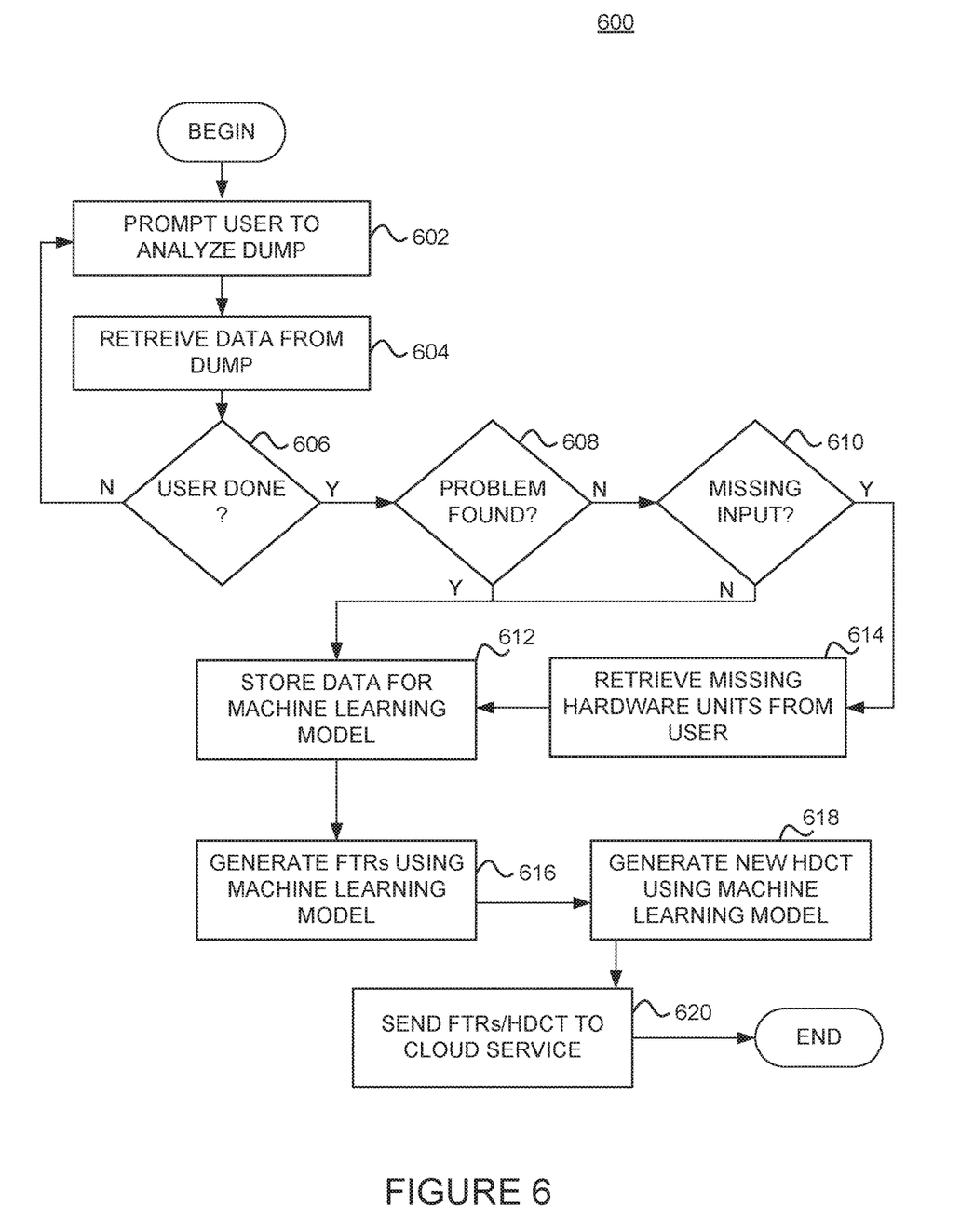
FIG. 6 is a flow chart illustrating a method for generating fault translation rules and a hardware dump content table, according to one embodiment.

FIG. 6 illustrates a method 600 for generating FTR(s) and/or a HDCT via machine learning techniques. The method 600 may be performed by the dump analysis tool 194 in FIGS. 1A, 1B and 1C. More generally, method 600 may be used with the individual and networked computing devices described in various embodiments above.

Method 600 begins at block 602, where the dump analysis tool 194 prompts a user (e.g., an administrator responsible for debugging dumps) via user interface 196 to analyze a dump. For example, the dump analysis tool 194 may prompt the user to read data from the dump. At block 604, the dump analysis tool 194 retrieves data from the dump as part of the analysis. For example, the dump analysis tool 194 may collect the problem resolution, the active FIRs from the dump, the hardware units contained in the dump, the hardware units accessed in the dump, etc. The dump analysis tool 194 may monitor the user's access to the data, and track the hardware units (within the dump) that are accessed by the user.

At block 606, the dump analysis tool 194 determines whether the user is done analyzing the dump. For example, the dump analysis tool 194 may generate a prompt on user interface 196 querying if the user has completed the analysis. If the user is done, the dump analysis tool 194 proceeds to block 608, and generates a prompt on user interface 196 querying the user if the user has identified a problem with the data collected from the dump. If the user indicates there is a problem, the dump analysis tool 194 stores the data for the machine learning model (e.g., at a storage location in cloud computing service 190). If the user indicates that there is not a problem, the dump analysis tool 194 prompts the user (e.g., on user interface 196) to indicate which inputs are missing in the dump (block 610). For example, the dump analysis tool 194 may prompt the user to indicate which hardware units (relevant to the error event) are missing from the dump.

If the user indicates that there are missing inputs (e.g., missing hardware units), the dump analysis tool 194 retrieves the missing hardware units from the user (block 614). On the other hand, if the user indicates there are no missing inputs, the dump analysis tool 194 proceeds to store the data for the machine learning model (e.g., at a storage location in cloud computing service 190). At block 616, the dump analysis tool 194 generates FTRs using the machine learning model. For example, the dump analysis tool 194 may use the trained machine learning model to process the data (e.g., from block 612) collected from the dump. At block 618, the dump analysis tool 194 generates a new HDCT using the machine learning model (e.g., by using the machine learning model to process data collected from the dump). At block 620, the dump analysis tool 194 sends the FTRs and/or HDCT to the cloud computing service 190. In some embodiments, the service module 160 may request the FTRs and/or HDCT from the cloud computing service 190 when performing a dump.

In some cases, the initial FIR to HU association (mapping) is determined manually, e.g., from the system design/architecture. In these cases, it may be assumed that the initial FIR to HU association (mapping) is correct since the mapping is derived from the chip design. However, due to hardware design errors, there may be situations in which the initial FIR to HU association is incorrect. As a reference example of an incorrect FIR to HU association, the CORE FIR may be triggered upon detecting an error, where the error is actually in the PCIE HU.

Embodiments herein provide techniques for detecting an improper FIR to HU association in data collected from a dump. For example, the dump analysis tool 194 may be configured to identify potential incorrect associations from data collected at block 612 of FIG. 6. In one embodiment, the dump analysis tool 194 may detect incorrect associations based on an indication (e.g., from the user) that the dump did not include the correct data. Additionally or alternatively, in one embodiment, the dump analysis tool 194 may detect incorrect associations based on the user accessing hardware units in the dump not indicated by the FIRs. If the dump analysis tool 194 determines that the number of instances in which (1) the user indicates the correct data is not included in the dump, and/or (2) the user accesses hardware units in the dump not indicated by the FIRs satisfies a predetermined threshold, the dump analysis tool 194 may notify/prompt a hardware designer to examine the instances. In this manner, the dump analysis tool 194 can improve the data that is used to generate FTRs/HDCTs and indicate design fixes that should be applied for future releases.

Figure 7:
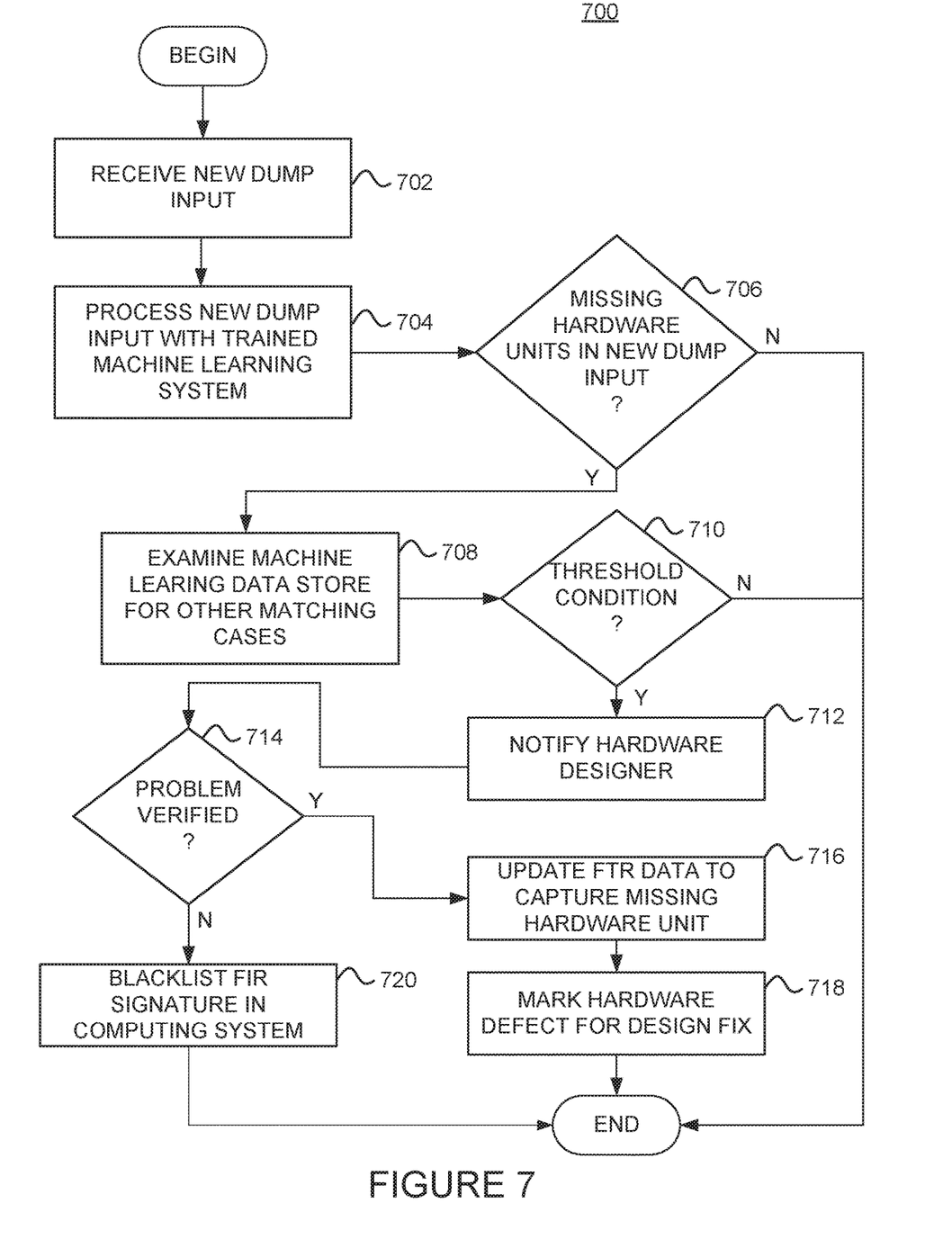
FIG. 7 is a flow chart illustrating a method for detecting improper fault isolation register to hardware unit associations in data collected from a dump, according to one embodiment.

FIG. 7 illustrates a method 700 for detecting improper FIR to HU associations in data collected from a dump. The method 700 may be performed by the dump analysis tool 194 in FIGS. 1A, 1B and 1C. More generally, method 700 may be used with the individual and networked computing devices described in various embodiments above.

Method 700 begins at block 702, where the dump analysis tool 194 receives new dump input. At block 704, the dump analysis tool 194 processes the new dump input with a trained machine learning system. For example, the machine learning system may be trained based on dump data collected from previous dumps performed over time and stored in a machine learning data store (e.g., in the cloud).

At block 706, the dump analysis tool 194 determines whether the new dump input is missing hardware units relevant to the error event that triggered the dump. For example, the dump analysis tool 194 may receive an indication from a user responsible for debugging the data, that the new dump input is missing a set of hardware units used to diagnose and debug the problem. In some examples, the dump analysis tool 194 may detect that the user is accessing data associated with hardware units that are not contained in the new dump input. In some examples, the dump analysis tool 194 may receive an indication from the user that the new dump input includes incorrect data (e.g., incorrect hardware units).

If the dump analysis tool 194 determines that the new dump input is missing hardware units and/or has incorrect data, the dump analysis tool 194 examines the machine learning data store (e.g., in which data collected from previous dumps is stored) for similar instances (e.g., corresponding to the instances of missing hardware units and/or instances of incorrect data in the first set of dump data) (block 708). At block 710, if the dump analysis tool 194 determines that a number of instances of missing hardware units and/or incorrect data satisfies a predetermined condition (e.g., exceeds a confidence interval threshold), the dump analysis tool 194 notifies a hardware designer (block 712). At block 714, the dump analysis tool determines if the problem is verified (e.g., whether the hardware designer has indicated that the problem notified at block 712 is correct). If not, the dump analysis tool 194 blacklists the FIR signature in the computing system, e.g., to prevent the FIR signature from triggering a problem in future dumps (block 720). On the other hand, if the problem is verified, the dump analysis tool 194 updates the FTR data in order to capture the missing hardware unit and/or remove the incorrect data (block 716). At block 718, the dump analysis tool 194 marks the hardware defect for a design fix.

Figure 8:
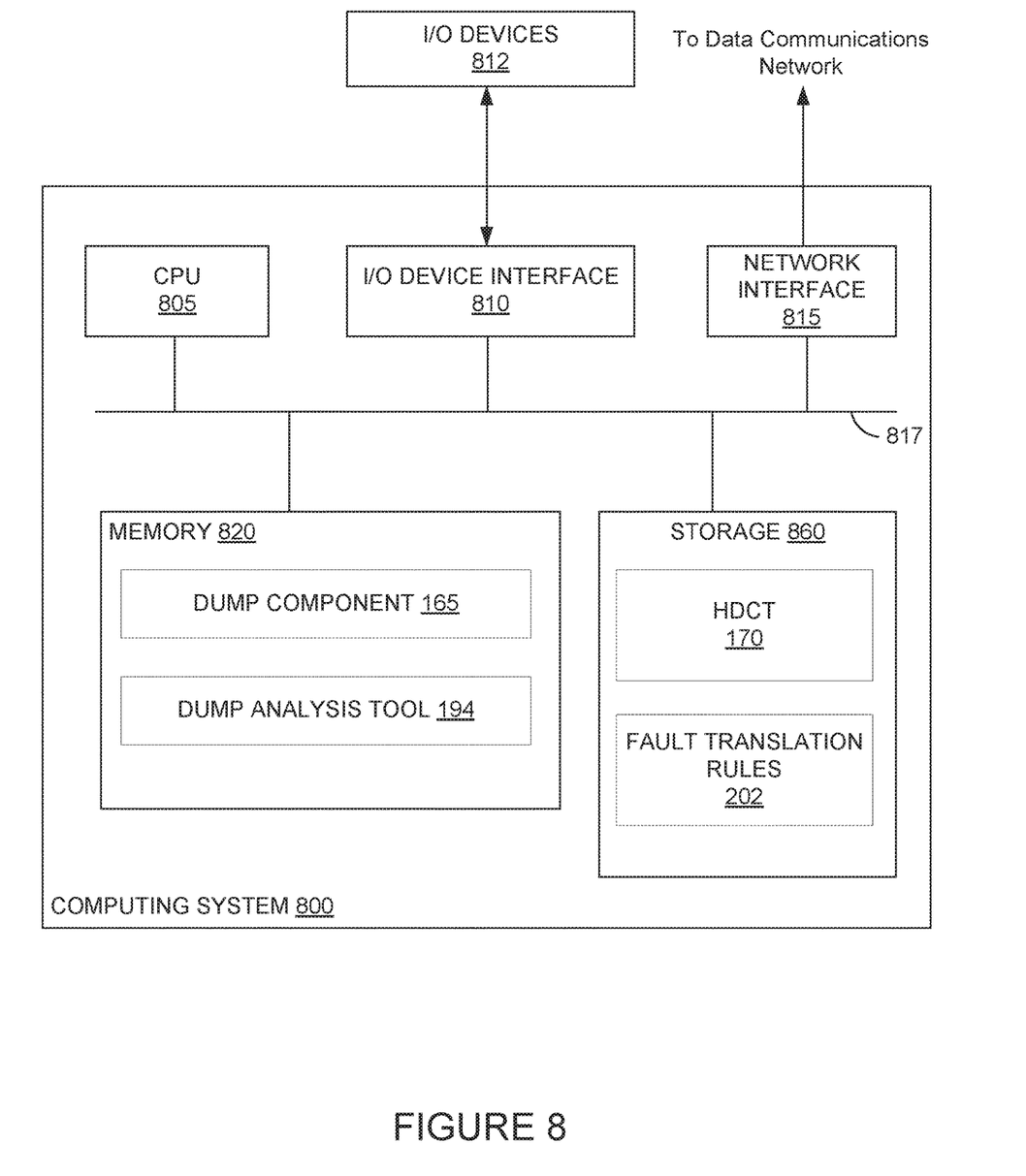
FIG. 8 is a block diagram illustrating a computing system configured to perform dump collection, according to one embodiment.

FIG. 8 illustrates a computing system 800 configured to perform dump collection, according to one embodiment. As shown, the computing system 800 includes, without limitation, a central processing unit (CPU) 805, a network interface 815, a memory 820, and storage 860, each connected to a bus 817. The computing system 800 may also include an I/O device interface 810 connecting I/O devices 812 (e.g., keyboard, mouse, and display devices) to the computing system 800. Further, in context of this disclosure, the computing elements shown in the computing system 800 may correspond to a physical computing system (e.g., a system in a data center) or may be a virtual computing instance executing within a computing cloud. In one embodiment, the computing system 800 can be an example of the computing systems illustrated in FIGS. 1A-1C (e.g., computing device 105, computing device 155, etc.).

The CPU 805 retrieves and executes programming instructions stored in the memory 820 as well as stores and retrieves application data residing in the memory 820. The interconnect 817 is used to transmit programming instructions and application data between CPU 805, I/O devices interface 810, storage 860, network interface 815, and memory 820. Note CPU 805 is included to be representative of a single CPU, multiple CPUs, a single CPU having multiple processing cores, and the like. Memory 820 is generally included to be representative of a random access memory. The storage 860 may be a disk drive storage device. Although shown as a single unit, storage 860 may be a combination of fixed and/or removable storage devices, such as fixed disc drives, removable memory cards, or optical storage, network attached storage (NAS), or a storage area-network (SAN). The storage 860 includes HDCT 170 and fault translation rules 202, both of which are described in more detail above. Illustratively, the memory 820 includes a dump component 165 and dump analysis tool 194, which are described in more detail above.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., dump component 165, HDCT 170, FTR component 192, dump analysis tool 194, etc.) or related data (e.g., dump data, machine learning models, etc.) available in the cloud. For example, the dump component 165, FTR component 192, and/or dump analysis tool 194 could execute on a computing system in the cloud and perform dump collection and/or analysis of dump data for diagnosing and debugging system faults. In such a case, the dump component 165 can perform dump collection and offload data collected from the dump to a storage location in the cloud. Similarly, the dump analysis tool 194 can generate FTRs and/or HDCTs for the dump component 165 to use for dump collection and store the generated FTRs and/or HDCTs in a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computer-implemented method for performing dump collection on a computing system, comprising:
    detecting an error event within the computing system;
    after detecting the error event, determining a subset of hardware registers of a plurality of hardware registers associated with the error event;
    determining one or more hardware units within the computing system based on a set of rules that specify an association between the one or more hardware units and the subset of hardware registers associated with the error event; and
    capturing data from each of the one or more hardware units, comprising:
        identifying one or more commands in a hardware dump content table (HDCT) corresponding to the one or more hardware units; and
        executing the one or more commands in the HDCT, wherein at least one of the set of rules and the HDCT is generated via a machine learning model.

2. The computer-implemented method of claim 1, further comprising:
    after detecting the error event, sending a request for at least one of the set of rules and the HDCT from another computing system hosted in a cloud computing environment; and
    receiving, in response to the request, at least one of the set of rules and the HDCT.

3. The computer-implemented method of claim 1, wherein inputs to the machine learning model comprise at least one of an indication of the subset of hardware registers, an indication of the one or more hardware units, and an indication which of the one or more hardware units were accessed by an administrator responsible for debugging the data.

4. The computer-implemented method of claim 1, wherein at least one input to the machine learning model comprises an indication of hardware units relevant to the error event that is missing from the captured data.

5. The computer-implemented method of claim 1, further comprising:
    while capturing the data, uploading different portions of data that has been captured to another computing system hosted in a cloud computing environment.

6. The computer-implemented method of claim 1, further comprising:
    after capturing the data, detecting a number of instances of errors contained in the captured data; and
    notifying a user that there is a hardware defect in the computing system if the number of instances of errors satisfies a predetermined threshold.

7. The computer-implemented method of claim 6, wherein detecting the number of instances of errors comprises receiving an indication that there is at least one hardware unit relevant to the error event that is missing from the captured data.

8. A system, comprising:
    at least one processor; and
    a memory storing a program, which, when executed on the at least one processor, performs an operation for dump collection on a computing system, the operation comprising:
        detecting an error event within the computing system;
        after detecting the error event, determining a subset of hardware registers of a plurality of hardware registers associated with the error event;
        determining one or more hardware units within the computing system based on a set of rules that specify an association between the one or more hardware units and the subset of hardware registers associated with the error event; and
        capturing data from each of the one or more hardware units, comprising:
            identifying one or more commands in a hardware dump content table (HDCT) corresponding to the one or more hardware units; and
            executing the one or more commands in the HDCT, wherein at least one of the set of rules and the HDCT is generated via a machine learning model.

9. The system of claim 8, the operation further comprising:
- after detecting the error event, sending a request for at least one of the set of rules and the HDCT from another computing system hosted in a cloud computing environment; and
- receiving, in response to the request, at least one of the set of rules and the HDCT.

10. The system of claim 8, wherein at least one input to the machine learning model comprises an indication of hardware units relevant to the error event that is missing from the captured data.

11. The system of claim 8, wherein inputs to the machine learning model comprise at least one of an indication of the subset of hardware registers, an indication of the one or more hardware units, and an indication which of the one or more hardware units were accessed by an administrator responsible for debugging the data.

12. The system of claim 8, the operation further comprising while capturing the data, uploading different portions of data that has been captured to another computing system hosted in a cloud computing environment.

13. The system of claim 8, the operation further comprising:
- after capturing the data, detecting a number of instances of errors contained in the captured data; and
- notifying a user that there is a hardware defect in the computing system if the number of instances of errors satisfies a predetermined threshold.

14. The system of claim 13, wherein detecting the number of instances of errors comprises receiving an indication that there is at least one hardware unit relevant to the error event that is missing from the captured data.

15. A computer program product, the computer program product comprising:
- a computer-readable storage medium having computer-readable program code embodied therewith, the computer-readable program code executable by one or more computer processors to perform an operation for dump collection on a computing system, the operation comprising:
    - detecting an error event within the computing system;
    - after detecting the error event, determining a subset of hardware registers of a plurality of hardware registers associated with the error event;
    - determining one or more hardware units within the computing system based on a set of rules that specify an association between the one or more hardware units and the subset of hardware registers associated with the error event; and
    - capturing data from each of the one or more hardware units, comprising:
        - identifying one or more commands in a hardware dump content table (HDCT) corresponding to the one or more hardware units; and
        - executing the one or more commands in the HDCT, wherein at least one of the set of rules and the HDCT is generated via a machine learning model.

16. The computer program product of claim 15, the operation further comprising:
- after detecting the error event, sending a request for at least one of the set of rules and the HDCT from another computing system hosted in a cloud computing environment; and
- receiving, in response to the request, at least one of the set of rules and the HDCT.

17. The computer program product of claim 15, wherein at least one input to the machine learning model comprises an indication of hardware units relevant to the error event that is missing from the captured data.

18. The computer program product of claim 15, wherein inputs to the machine learning model comprise at least one of an indication of the subset of hardware registers, an indication of the one or more hardware units, and an indication which of the one or more hardware units were accessed by an administrator responsible for debugging the data.

19. The computer program product of claim 15, the operation further comprising while capturing the data, uploading different portions of data that has been captured to another computing system hosted in a cloud computing environment.

20. The computer program product of claim 15, the operation further comprising:
- after capturing the data, detecting a number of instances of errors contained in the captured data; and
- notifying a user that there is a hardware defect in the computing system if the number of instances of errors satisfies a predetermined threshold.

* * * * *